United States Patent [19]

Boothe et al.

[11] Patent Number: 4,650,591

[45] Date of Patent: Mar. 17, 1987

[54] ACRYLIC ACID/2-ACRYLAMIDO-2-METHYLPROPYLSULFONIC ACID/2-ACRYLAMIDO-2-METHYLPROPYL PHOSPHONIC ACID POLYMERS AS SCALE AND CORROSION INHIBITORS

[75] Inventors: Jerry E. Boothe, Coraopolis; Raymond J. Schaper, Pittsburgh, both of Pa.

[73] Assignee: Calgon Corporation, Pittsburgh, Pa.

[21] Appl. No.: 770,458

[22] Filed: Aug. 29, 1985

[51] Int. Cl.⁴ .............................................. C02F 5/14
[52] U.S. Cl. ................................. 210/700; 210/701; 252/180; 422/15; 422/16
[58] Field of Search ................ 210/699–701; 422/15–17; 252/180, 181

[56] References Cited

U.S. PATENT DOCUMENTS

| | | | |
|---|---|---|---|
| 3,709,815 | 1/1973 | Boothe et al. | 210/701 |
| 3,898,037 | 8/1975 | Lange et al. | 210/701 X |
| 3,928,196 | 12/1975 | Persinski et al. | 210/701 |
| 4,526,728 | 7/1985 | Finke et al. | 210/700 X |
| 4,552,665 | 11/1985 | Ralston | 210/700 X |
| 4,589,985 | 5/1986 | Yorke | 210/699 |
| 4,604,211 | 8/1986 | Kneller et al. | 210/701 |

*Primary Examiner*—Tom Wyse
*Attorney, Agent, or Firm*—W. C. Mitchell; R. B. Olson; M. C. Sudol, Jr.

[57] ABSTRACT

The present invention is directed to a method of inhibiting corrosion and the precipitation of scale-forming salts in an aqueous system, comprising adding to the system at least 0.1 mg/l of a polymer having an intrinsic viscosity of 0.05 to 4.5 dl/g, in 1.0 M NaCl, prepared from:

(A) 35 to 65%, by weight, of acrylic acid or methacrylic acid;
(B) 15 to 45%, by weight, of 2-acrylamido-2-methylpropylsulfonic acid or 2-methacrylamido-2-methylpropylsulfonic acid; and
(C) 15 to 25%, by weight, of 2-acrylamido-2-methylpropyl phosphonic acid or 2-methacrylamido-2-methylpropylphosphonic acid.

6 Claims, No Drawings

ACRYLIC ACID/2-ACRYLAMIDO-2-METHYLPROPYLSULFONIC ACID/2-ACRYLAMIDO-2-METHYLPROPYL PHOSPHONIC ACID POLYMERS AS SCALE AND CORROSION INHIBITORS

BACKGROUND OF THE INVENTION

U.S. Pat. No. 3,928,196 discloses the use of a copolymer of 2-acrylamido-2-methylpropylsulfonic acid (hereinafter "AMPSA") and acrylic acid in inhibiting scale.

Published European Patent application 89,654 discloses copolymers of 2-acrylamido-2-methylpropyl phosphonic acid (hereinafter "AMPPA") and acrylamide or acrylic acid as scale inhibitors.

Most industrial waters contain alkaline earth metal cations, such as calcium, barium, magnesium etc. and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction products, a solid phase of calcium carbonate will form.

Solubility product concentrations are exceeded for various reasons, such as partial evaporation of the water phase, change in pH, pressure or temperature, and the introduction of additional ions which form insoluble compounds with the ions already present in the solution.

As these reaction products precipitate on surfaces of the water carrying system, they form scale or deposits. This accumulation prevents effective heat transfer, interferes with fluid flow, facilitates corrosive processes, and harbors bacteria. This scale is an expensive problem in many industrial water systems causing delays and shutdowns for cleaning and removal.

Scale-forming compounds can be prevented from precipitating by inactivating their cations with chelating or sequestering agents, so that the solubility of their reaction products is not exceeded. Generally, this requires many times as much chelating or sequestering agent as cation, since chelation is a stoichiometric reaction, and these amounts are not always desirable or economical.

Almost 50 years ago, it was discovered that certain inorganic polyphosphates would prevent such precipitation when added in amounts far less than the concentrations needed for sequestering or chelating.

When a precipitation inhibitor is present in a potentially scale-forming system at a markedly lower concentration than that required for sequestering (stoichiometric) the scale-forming cation, it is said to be present in "threshold" amounts. See for example, Hatch and Rice, "Industrial Engineering Chemistry", Vol. 31, pages 51 to 53 (January 1939); Reitemeier and Buehrer, "Journal of Physical Chemistry", Vol. 44, No. 5, pages 535 to 536 (May 1940); Fink and Richardson, U.S. Pat. No. 2,358,222; and Hatch, U.S. Pat. No. 2,539,305.

Generally, sequestering take place at a weight ratio of threshold active compound to scale-forming cation components of greater than about 10:1, depending on the anion components in the water. Threshold inhibition generally takes place at a weight ratio of threshold active compound to scale-forming cation components of less than about 0.5:1.0.

Certain water soluble polymers, including groups derived from acrylamide and acrylic acid have been used to condition water containing scale-forming compounds. As for example, see U.S. Pat. Nos. 2,783,200; 3,514,476; 2,980,610; 3,285,886; 3,463,730 and 3,518,204.

The polymers of the present invention have been found to be effective corrosion and scale inhibitors, in particular, in inhibiting calcium phosphate and calcium carbonate scale.

DESCRIPTION OF THE INVENTION

The instant invention is directed to a method of inhibiting corrosion and the precipitation of scale-forming salts in an aqueous system, comprising adding to the system at least 0.1 mg/l of a polymer having an intrinsic viscosity of 0.05 to 4.5 dl/g, in 1.0M NaCl, prepared from:

(A) 35 to 65%, by weight, of acrylic acid or methacrylic acid;
(B) 15 to 45%, by weight, of 2-acrylamido-2-methylpropylsulfonic acid or 2-methacrylamido-2-methylpropylsulfonic acid; and
(C) 15 to 25%, by weight, of 2-acrylamido-2-methylpropyl phosphonic acid or 2-methacrylamido-2-methylpropylphosphonic acid.

The polymers are prepared from 35 to 65%, preferably 40 to 60%, by weight, acrylic acid or methacrylic acid, preferably acrylic acid; 15 to 45%, preferably 20 to 40%, by weight, 2-acrylamido-2-methylpropylsulfonic acid (hereinafter "AMPSA") or 2-methacrylamido-2-methylpropylsulfonic acid, preferably AMPSA; and 15 to 25%, preferably 20%, by weight, 2-acrylamido-2-methylpropyl phosphonic acid (hereinafter "AMPPA") or 2-methacrylamido-2-methylpropylphosphonic acid. Terpolymers are preferred. AMPPA may be prepared as described in U.S. Pat. No. 4,526,728.

The phrase "scale-forming salts" is meant to include any of the scale-forming salts, including, but not limited to, calcium carbonate, calcium sulfate, calcium phosphate, calcium phosphonate (including calcium hydroxyethylidene diphosphonic acid), calcium oxalate and barium sulfate.

Calcium phosphate scale is a particular problem at a pH of 7 to 9. The polymers of the instant invention were surprisingly found to be effective at a pH 7 to 9 and at temperatures ranging from 0° to 80° C.

The polymer is used at a minimum dosage of 0.1 mg/l in inhibiting scale and corrosion, preferably in a dosage of 1 to 100 mg/l.

The polymers may be prepared by mixing the monomers preferably in the presence of a free radical initiator. Any free radical initiator may be used. Examples include peroxides, azo initiators and redox systems. The polymerization may also be initiated photochemically. The preferred catalysts are sodium persulfate or a mixture of ammonium persulfate and any azo type initiator, such as 2,2'-azobis-(2,4-dimethyl-4-methoxyvaleronitrile).

The polymerization may be conducted by any of a variety of procedures, for example, in solution, suspension, bulk and emulsions.

The reaction temperature is not critical. The reaction will generally occur between 10° and 100° C., preferably 40° to 60° C. It is generally impractical to run the reaction below room temperature because the reaction is too slow. Above a temperature of 60° C., the molecular weight of the polymer tends to decrease. The reaction, depending on the temperature, generally takes from 1 to 12 hours. Measuring for residual monomer will verify when the reaction is complete.

The pH of the reaction mixture is not critical. The pH is generally in the range of 3.5 to 9.0.

The percent solids in the reaction mixture is not critical. The preferred range is 1 to 50%, by weight, solids.

The molecular weight of polymers is difficult to accurately measure. The polymers are, instead, usually identified by intrinsic viscosity. The intrinsic viscosity of the polyampholyte is critical in the instant invention. The intrinsic viscosity should be 0.05 to 4.5, preferably 0.5 to 2.5 dl/g, in 1.0M sodium chloride (measured on a 75 Cannon Ubbelohde capillary viscometer).

The polymers of the instant invention have been found to be effective as scale inhibitors, particularly in inhibiting calcium phosphate scale. The polymers of the present invention may be used in combination with other scale inhibitors (in particular, phosphonates) or with other corrosion inhibitors (in particular, zinc).

EXAMPLES 1 AND 2

The polymers of the examples were produced by mixing the monomers indicated in Table 1, in the amounts, solids concentration, initial temperatures and pH indicated. The monomer mix was purged with nitrogen for one hour. The solvent was deionized water. The initiator was added and the components allowed to react for about 3 hours.

TABLE I

| Example | Monomers | Wt % | Initiator | Solids | pH | Temp. | $[\eta]^6$ |
|---|---|---|---|---|---|---|---|
| 1 | AA[1]/AMPSA[2]/AMPPA[3] | 60/20/20 | 1.1% SPS[4]/1.7% NaHSO$_3$[5] | 28% | 4.4 | 25° C. | 0.21 |
| 2 | AA/AMPSA/AMPPA | 40/40/20 | 1.1% SPS/1.7% NaHSO$_3$ | 28% | 4.4 | 25° C. | 0.11 |

[1]AA = acrylic acid
[2]AMPSA = 2-acrylamido-2-methylpropylsulfonic acid
[3]AMPPA = 2-acrylamido-2-methylpropyl phosphonic acid
[4]SPS = sodium persulfate
[5]NaHSO$_3$ = sodium bisulfite
[6]dl/g in 1.0 M NaCl, measured in a 75 Cannon Ubbelohde capillary viscometer

EXAMPLES 3 THROUGH 7

Various polymers were screened for threshold inhibition of calcium carbonate and calcium phosphate. Stagnant flask tests were used with solutions stored for 24 hours at constant temperature. The standard test conditions used were as follows:

|  | Calcium Carbonate | Calcium Phosphate |
|---|---|---|
| Calcium, mg/l | 200 | 200 |
| Bicarbonate, mg/l | 600 | — |
| Phosphate, mg/l | — | 9 |
| pH | 8.0 | 8.5 |
| Temperature, °C. | 60 | 60 |

Two flasks were used for each test; one for a control (no inhibitor) and one with the polymer. The percent inhibition was determined by the following equation:

$$\text{Percent Inhibition} = \frac{S_T - S_C}{S_I - S_C} \times 100 \text{ where:}$$

$S_I$ = level of test specie initially;
$S_C$ = level of test specie at end of control test; and
$S_T$ = level of test specie at end of inhibitor test.

Calcium was used as the test specie in the calcium carbonate and phosphate was the test specie in the calcium phosphate test. The results are summarized in Table II.

TABLE II

| | | | Scale Inhibition Performance Results | | | | | | |
|---|---|---|---|---|---|---|---|---|---|
| | | | CaCO$_3$ (pH = 8.0) | | | Ca/PO$_4$ (pH = 8.5) | | | |
| Example | Composition | $[\eta]$ dl/g | at 1 mg/l | at 2 mg/l | at 4 mg/l | at 5 mg/l | at 6 mg/l | at 8 mg/l | at 10 mg/l |
| 3* | 60/40 AA[1]/AMPSA[2] | 0.2 | 74 | 76 | 80 | 1 | 71 | 100 | — |
| 4* | 60/40 AA/AMPPA[3] | 0.18 | 71 | — | 100 | 0 | 0 | 6 | 13 |
| 5* | 40/40/20 AA/AMPSA/AM[4] | 0.10 | 44 | 50 | 31 | 38 | 95 | 99 | 100 |
| 6 | 60/20/20 AA/AMPSA/AMPPA (Example 1) | 0.21 | 81 | 100 | 100 | 2 | 15 | 100 | 100 |
| 7 | 40/40/20 AA/AMPSA/AMPPA (Example 2) | 0.11 | 76 | 82 | 80 | 90 | 98 | 100 | — |

*Comparison Examples
[1]AA = acrylic acid
[2]AMPSA = 2-acrylamido-2-methylpropylsulfonic acid
[3]AMPPA = 2-acrylamido-2-methylpropyl phosphonic acid
[4]AM = acrylamide

TABLE III

| | | | Scale Inhibition Performance Results | | | | | | |
|---|---|---|---|---|---|---|---|---|---|
| | | | CaCO$_3$ (pH = 8.8) | | | | Ca/CO$_3$ (pH = 9.0) | | |
| Example | Composition | $[\eta]$ dl/g | at 5 mg/l | at 10 mg/l | at 20 mg/l | at 30 mg/l | at 20 mg/l | at 30 mg/l | at 40 mg/l | at 50 mg/l |
| 8 | 60/20/20 AA[1]/AMPSA[2]/AMPPA[3] (Example 1) | 0.21 | 47 | 50 | 69 | 65 | 51 | 59 | 59 | 64 |
| 9 | 40/40/20 AA/AMPSA/AMPPA | 0.11 | — | — | — | — | 36 | 46 | 49 | 45 |

TABLE III-continued

| | | Scale Inhibition Performance Results | | | | | | | |
|---|---|---|---|---|---|---|---|---|---|
| | | | CaCO₃ (pH = 8.8) | | | | Ca/CO₃ (pH = 9.0) | | |
| Example | Composition | [η] dl/g | at 5 mg/l | at 10 mg/l | at 20 mg/l | at 30 mg/l | at 20 mg/l | at 30 mg/l | at 40 mg/l | at 50 mg/l |
| | (Example 2) | | | | | | | | | |

¹AA = acrylic acid
²AMPSA = 2-acrylamido-2-methylpropylsulfonic acid
³AMPPA = 2-acrylamido-2-methylpropyl phosphonic acid
Test Conditions
250 mg/l Ca⁺⁺ and 600 mg/l HCO₃⁻, CO₃⁻²
55° C., 24 hours, Whatman 42 filter paper

TABLE IV

Corrosion Rates for Carbon Steel in 4x Tap Water
(pH = 7.5; 50° C.; linear polarization)

| Example | Composition (concentration, mg/l) | Corrosion Rate (mpy) |
|---|---|---|
| 10 | Blank | 26.8 ± 5.7 |
| 11 | 60/20/20 AA/AMPSA/AMPPA (15) | 8.83 ± 0.67 |
| 12 | 60/20/20 AA/AMPSA/AMPPA (15) + Zn (5) | 6.54 ± 1.80 |
| 13 | 40/40/20 AA/AMPSA/AMPPA (15) | 9.05 ± 0.85 |
| 14 | 40/40/20 AA/AMPSA/AMPPA (15) + Zn (5) | 7.73 ± 1.21 |

TABLE V

Admiralty 443 Corrosion Rates
Conditions: 4x Water, pH = 8.5,
Temp. = 50° C., 7 day immersion
40/40/20 AA/AMPSA/AMPPA (Example 2)

| Example | Treatment Level mg/L Active | Corrosion Rate mpy | Percent Corrosion Reduction |
|---|---|---|---|
| 15 | 0 | .52 | 0 |
| 16 | 1.0 | .0645 | 87.6 |
| 17 | 10.0 | .0733 | 86.0 |
| 18 | 30.0 | .3633 | 30.1 |

TABLE VI

Admiralty 443 Corrosion Rates
Conditions: 3% NaCl, pH = 7.0, Room Temp.,
7 day immersion
40/40/20 AA/AMPSA/AMPPA (Example 2)

| Example | Treatment Level mg/L Active | Corrosion Rate mpy | Percent Corrosion Reduction |
|---|---|---|---|
| 19 | 0 | 7.06 | 0 |
| 20 | 2 | 5.736 | 18.8 |
| 21 | 10 | 4.834 | 31.6 |

What is claimed is:

1. A method of inhibiting corrosion and the precipitation of scale-forming salts in an aqueous system, comprising adding to the system at least 0.1 mg/l of a polymer having an intrinsic viscosity of 0.05 to 4.5 dl/g, in 1.0M NaCl, prepared from:

(A) 35 to 65%, by weight, of acrylic acid or methacrylic acid;

(B) 15 to 45%, by weight, of 2-acrylamido-2-methylpropylsulfonic acid or 2-methacrylamido-2-methylpropylsulfonic acid; and (C) 15 to 25%, by weight, of 2-acrylamido-2-methylpropyl phosphonic acid or 2-methacrylamido-2-methylpropylphosphonic acid.

2. The method of claim 1, wherein 1 to 100 mg/l of said polymer is added to the system.

3. The method of claim 1, wherein said scale-forming salts are calcium carbonate and calcium phosphate.

4. The method of claim 1, wherein said polymer is prepared from acrylic acid, 2-acrylamido-2-methylpropylsulfonic acid and 2-acrylamido-2-methylpropyl phosphonic acid.

5. The method of claim 1, wherein said polymer is prepared from 40 to 60%, by weight, acrylic acid; 20 to 40%, by weight, 2-acrylamido-2-methylpropylsulfonic acid; and 15 to 25%, by weight, 2-acrylamido-2-methylpropyl phosphonic acid.

6. The method of claim 1, wherein said polymer has an intrinsic viscosity of 0.05 to 2.5 dl/g, in 1.0M NaCl.

* * * * *